(12) United States Patent
Bougeard et al.

(10) Patent No.: US 7,437,922 B2
(45) Date of Patent: Oct. 21, 2008

(54) METHOD OF MONITORING THE OPERATIONAL CONDITION OF A TIRE

(75) Inventors: Maud Bougeard, Volvic (FR); Jean-Pierre Francois, Romagnat (FR); Julien Marchand, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/797,411

(22) Filed: May 3, 2007

(65) Prior Publication Data

US 2007/0295073 A1 Dec. 27, 2007

(30) Foreign Application Priority Data

May 4, 2006 (FR) .................................. 06 04000

(51) Int. Cl.
*B60C 23/02* (2006.01)

(52) U.S. Cl. ...................................... 73/146.5; 340/447
(58) Field of Classification Search .................. 73/146, 73/146.5; 340/447

See application file for complete search history.

(56) References Cited

U.S. PATENT DOCUMENTS

| | | | | |
|---|---|---|---|---|
| 5,231,872 A | * | 8/1993 | Bowler et al. .............. 73/146.5 |
| 5,505,080 A | * | 4/1996 | McGhee ..................... 73/146.5 |
| 5,611,875 A | * | 3/1997 | Bachhuber .................. 152/415 |
| 5,629,873 A | * | 5/1997 | Mittal et al. ................ 702/140 |
| 5,838,229 A | * | 11/1998 | Robinson, III .............. 340/442 |
| 6,246,317 B1 | | 6/2001 | Pickornik et al. |

FOREIGN PATENT DOCUMENTS

EP    1 516 753    3/2005

* cited by examiner

*Primary Examiner*—Andre J Allen
(74) *Attorney, Agent, or Firm*—Young & Thompson

(57) ABSTRACT

A method for monitoring the operational condition of a tire equipping a vehicle, includes: producing, over time, representative samples of successive values assumed by a changing physical quantity, under otherwise equal conditions, with respect to the number of moles of gaseous fluid present in this tire, exploiting these samples in order to deduce from them an estimated condition of the tire, comparing it to a range of normal driving conditions, and producing an alarm in the case where the estimated condition of the tire is situated outside the range of these normal conditions. The step of exploiting the sample includes comparing the value of an indicator of dispersion of the physical quantity, such as the variance of this quantity, to a predetermined threshold value (L).

15 Claims, 2 Drawing Sheets

METHOD OF MONITORING THE OPERATIONAL CONDITION OF A TIRE

Figures 1, 2:
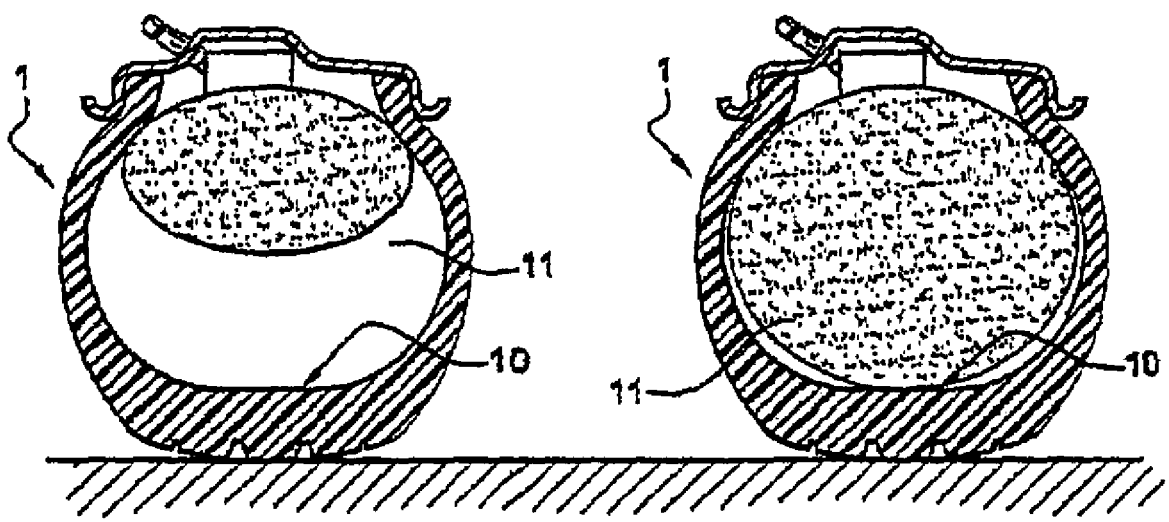

The invention relates in general to techniques associated with making motor vehicles safe.

More precisely, the invention relates to a method for monitoring the operational condition of a tire equipping a vehicle, this method including at least the steps consisting in producing, over time, representative samples of successive values assumed by a changing physical quantity, under conditions otherwise equal, with respect to the number of moles of gaseous fluid present in this tire, in exploiting these samples in order to deduce from them an estimated condition of the tire, and in comparing it to a range of normal driving conditions, and in producing an alarm in the case where the estimated condition of the tire is situated outside the range of these normal conditions.

A method of this type, for example, is known by those skilled in the art by way of the patent document FR 2 622 845.

According to this known method, the condition of one tire of the vehicle is compared to the condition of another tire of this same vehicle, taken as a reference, the variance in the respective conditions of the tires compared leading to the identification of an anomaly.

Despite its advantage, this technique suffers from several limitations.

As a matter of fact, on the one hand, this known method makes it possible, with difficulty, to detect a defect affecting the tires compared in a relatively equal manner.

On the other hand, this known method can take normal deviations between the tires compared as an anomaly, such as the deviation likely to result from the fact that one of the tires is exposed to the sun while the other is in the shade.

Although, by way of the patent U.S. Pat. No. 6,246,317, those skilled in the art also know a more efficient method for monitoring the condition of the tires of a vehicle, no known method enables a completely effective discrimination of the various conditions of a tire.

Within this context, the purpose of the invention is to propose a method for monitoring the operational condition of a tire which meets this need.

To that end, the method of the invention, in other respects consistent with the generic definition given of it by the above preamble, is characterized substantially in that the step of exploiting the samples includes at least one operation consisting in comparing an indicator of dispersion of said physical quantity to a predetermined threshold value, in that the physical quantity used consists of the ratio of the temperature of the gaseous fluid to its pressure, and in that the alarm indicates a leak in the tire, at least in a case where, at the same time, this physical quantity increases while its variance exceeds the predetermined threshold value.

The indicator of dispersion of the physical quantity, for example, consists of the variance in this quantity or its standard deviation.

The physical quantity used is preferably chosen from the set including the pressure of the gaseous fluid, the ratio of the temperature of the gaseous fluid to its pressure, and the ratio of the pressure of the gaseous fluid to its temperature.

The step of exploiting the samples includes, for example, pre-formatting operations consisting in calculating at least one average from p1 successive samples of the physical quantity, and in calculating a sliding value for the indicator of dispersion of the physical-quantity from q1 averages, p1 and q1 being whole numbers greater than 1.

Each new calculation of the average is advantageously performed on p1 new samples of the physical quantity, different from the p1 samples used for the preceding calculation of this average, and the sliding value for the indicator of dispersion of the physical quantity is recalculated upon each new calculation of the average.

In order to be able to monitor the possible appearance of defects of various types, it is possible to provide for the step of exploiting the samples to include pre-formatting operations consisting in concurrently calculating k averages from different respective numbers pk of different samples of the physical quantity, and in calculating k sliding values for the indicator of dispersion of the physical quantity from different respective numbers qk of different averages, k, pk and qk being whole numbers greater than 1.

Furthermore, the step of exploiting the samples can include an operation consisting in taking into account the sign of the change in the physical quantity and/or the speed of the vehicle in order to distinguish, in the event of an alarm, between two different estimated conditions of the tire.

In the case where the physical quantity used consists of the ratio of the temperature of the gaseous fluid to its pressure, the alarm indicates reinflation of the tire at least in the case where, at the same time, this physical quantity decreases while its variance exceeds the predetermined threshold value and while the speed of the vehicle is zero.

The monitoring method of the invention is very advantageously applied to a tire containing a foam tube capable of coming into contact with the inside face of this tire.

In this case, and if the physical quantity consists of the ratio of the temperature of the gaseous fluid to its pressure, the alarm indicates contact of the foam tube with the inside face of the tire, at least in a case where, at the same time, this physical quantity decreases while its variance exceeds the predetermined threshold value and while the speed of the vehicle is not zero.

Other characteristics and advantages of the invention will be deduced clearly from the description of it given hereinafter, for illustrative and non-limiting purposes, with reference to the appended drawings, in which:

FIG. 1 is a sectional view of the lower portion of a tire equipped with a foam tube and shown in a normal operating condition;

FIG. 2 is a sectional view of the lower portion of the tire illustrated in FIG. 1 and shown in a malfunctioning condition having led to the expansion of the foam tube; and FIGS. 3A to 3D are diagrams showing, respectively, with respect to time t, the evolution of the pressure P, the temperature T, the ratio T/P of the temperature to the pressure, and the variance $S^2(T/P)$ of the ratio T/P of the temperature to the pressure in a tire equipped with a foam tube and undergoing a breakdown.

As indicated previously, the invention relates to a method for monitoring the operational condition of a tire 1 equipping a vehicle.

This method typically, includes an acquisition step consisting in producing, over time, samples G(n) representative of successive values assumed at sampling moments n by a physical quantity G associated with the condition of the tire 1, an exploitation step consisting in exploiting these samples G(n) in order to deduce from them an estimated condition of the tire 1 and to compare it to a range of normal driving conditions, and a signaling step consisting in producing an alarm in the case where the estimated condition of the tire 1 is situated outside the range of these normal conditions, in particular due to a leak.

The physical quantity G is more precisely chosen to change, under conditions otherwise equal, with respect to the number of moles N of gaseous fluid present in this tire 1, so as to enable the use of Mariotte's law, which associates the pressure P, the volume V, the number of moles N and the temperature T of an ideal gas contained in an enclosure by the following relationship:

P.V=N.R.T, where R is a thermodynamic constant well known to those skilled in the art.

According to the invention, the step of exploiting the samples includes at least one operation consisting in comparing the value for an indicator of dispersion of the physical quantity G to a threshold value L obtained experimentally and, in any event, predetermined.

Thus, contrary to the known method of the aforesaid patent, the method of the invention, which exploits the physical quantity G by means of an indicator of dispersion, frees itself from the necessity of comparing the condition of each tire of the vehicle to the condition of another tire of this same vehicle.

The indicator of dispersion of the physical quantity G, for example, consists of the variance $S^2_1(G)$ of this quantity, or of its standard deviation.

The method of the invention furnishes the best results in the case where the physical quantity G used consists of the pressure. P of the gaseous fluid, or the ratio T/P of the temperature T of the gaseous fluid to its pressure P, or else the ratio P/T of the pressure P of the gaseous fluid to its temperature T.

The step of exploiting the samples G(n) includes preliminary calculation operations making it possible to obtain the variance $S^2_1(G)$ of the physical quantity G.

To accomplish this, it is possible, after the acquisition of p1 samples G(n) of the quantity G, to calculate an average $M_{1j}$ such that:

$$M_{1j} = \sum_{n=j-p1}^{j} G(n)/p1$$

where p1 whole number greater than 1.

Upon obtaining each new value for the average $M_{1j}$, a new value for the variance is calculated by applying the formula:

$$S^2 1(G) = \sum_{k=j-q1}^{j} \frac{(M1k - m_j)^2}{q1-1}$$

where q1 is a whole number greater than 1, and where $m_j$ is the average of the q1 averages M1k, namely:

$$m_j = \sum_{n=j-q1}^{j} M1k/q1.$$

In practice, it is desirable to calculate each new value for the average $M_{1j}$ by means of p1 new samples of the quantity G, different from the p1 samples used for calculating the previous value for the average $M_{1,j-p1}$.

Furthermore, a new value for the variance is preferably calculated upon obtaining each new value for the average.

The method of the invention makes it possible, in particular, to detect a possible leak in the tire.

In order to optimize detection and adapt it to the seriousness of the leak, which can be relatively fast, it may be well-advised to monitor not one single value for the variance of the quantity G, but several values for this variance.

In order to do this, for example, it is foreseeable to concurrently calculate k averages, such as $M_{1j}$ to $M_{kj}$, of the physical quantity G, from different respective numbers pk of successive samples G(n) of this quantity G, where k and pk are whole numbers greater than 1.

In other words, these averages are calculated in time windows of different durations.

It is then possible to calculate k values, such as $S^2_1(G)$ to $S^2_k(G)$, for the variance of the physical quantity G from different respective numbers qk of different averages, where qk is itself a whole number greater than 1.

The values for the variance obtained from the averages calculated in time windows of relatively short duration are suitable for monitoring relatively fast phenomena, whereas the values for the variance obtained from the averages calculated in time windows of relatively long duration are suitable for monitoring relatively slow phenomena.

In order to further improve the quality of the evaluation of the condition of the tire 1, and, in particular, in order to distinguish between two different estimated conditions of the tire, in the event of an alarm, i.e., in the event that the threshold value L is exceeded by a calculated value for the variance of the physical quantity G, the method of the invention further provides for taking into account the sign of the change in the physical quantity G and/or the speed X' (t) of the vehicle.

The method of the invention can be applied not only to the monitoring of standard tires, but also to that of tires that contain a foam tube 11, as shown in FIGS. 1 and 2.

A foam tube is a torus consisting of a closed-cell foam material, as introduced, in particular, in the document FR 1 450 638. The foam material is preferably leak-proof. The closed cells contain a gas under a pressure greater than atmospheric pressure but less than the usual tire inflation pressure. Consequently, foam tubes arranged inside the cavity of a tire and a rim are in the compressed state when the pressure inside the cavity is the usual inflation pressure, but gradually expand until being capable of occupying practically this entire cavity when the pressure inside the cavity decreases due to a leak, for example.

In a tire of this type, the foam tube 11 is in a compressed state (FIG. 1) as long as this tire is in a normal operating condition, but gradually expands in the event of a leak in the tire, and can even come into contact with the inside face 10 of this tire 1 (FIG. 2) in the event of a prolonged leak.

Under these conditions, replacement of the lost air inside the tire 1, via expansion of the tube 11, makes it particularly difficult to monitor a possible change in the condition of this tire.

However, in particular by choosing the ratio T/P of the temperature T of the gaseous fluid to its pressure P, as the physical quantity G, the method of the invention makes it possible to reliably produce an alarm indicating a leak in the tire 1, in the case where, at the same time, this ratio T/P increases while its variance $S^2_1(G)$ exceeds the predetermined threshold value L.

In the same way, still by choosing the ratio T/P of the temperature T of the gaseous fluid to its pressure P, as the physical quantity G, the method of the invention makes it possible to reliably produce an alarm indicating that the tire 1 is only being reinflated, in the case where, at the same time, this ratio T/P decreases while its variance $S^2_1(G)$ exceeds the predetermined threshold value L and while the speed X' (t) of the vehicle is zero.

By choosing the ratio T/P as the physical quantity G, the method of the invention further makes it possible to reliably produce an alarm indicating contact of the foam tube 11 with the inside face 10 of the tire 1, in the case where, at the same time, this ratio T/P decreases while its variance $S^2_1(G)$ exceeds the predetermined threshold value L and while the speed X' (t) of the vehicle is not zero.

Although not necessary, in one particular embodiment, a rapid leak alarm can be sounded to report the occurrence of the logical combination:

(C1 OR (C4 AND C5)) AND (C2 AND C3 AND (C6 OR C7)), where C1 to C7 are conditions that will be specified later.

In the same way, a reinflation alarm can be sounded to report the occurrence of the logical combination:

(C1 AND NOT-C2 AND NOT-C3)

An alarm for contact of the foam tube 11 with the inside face 10 of the tire 1 can be sounded to report the occurrence of the logical combination:

(C1 AND NOT-C2 AND C3) OR (C2 AND C4 AND C8), the occurrence of the condition (C1 AND NOT-C2 AND C3 ), resulting in the alarm being triggered, and the occurrence of the condition (NON-C2 AND C4 AND C8 ), causing the alarm to be maintained in order to prevent any possible instability due to inaccurate measurements.

The conditions C1 to C8 have the following meanings.

C1: the variance in the ratio T/P exceeds the threshold L;
C2: the ratio T/P increases;
C3: the speed X' (t) of the vehicle is not zero;
C4: the variance in the ratio T/P exceeds the threshold L-e where "e" is a small quantity compared to L, of the order of the value of the uncertainties of measurement of the quantity G, and making it possible to introduce an hysteresis into the production of the alarm;
C5: a rapid leak alarm has already been produced at a previous moment;
C6: an alarm for contact of the foam tube 11 with the inside face 10 of the tire 1 has just been produced;
C7: the time elapsed since a contact alarm is longer than a cooling down time period;

In order to prevent false leak detections due to a cooldown following contact with the foam tube, counting of the time elapsed since the last contact is actually introduced.

C8: a alarm for contact of the foam tube 11 with the inside face 10 of the tire 1 was produced at the moment of the previous sampling;

In order to put the hysteresis parameter "e" in place, it is verified whether contact actually occurred at the previous moment.

The application of the method of the invention to a actual case of a leak in a tire equipped with a foam tube 11 is shown in FIGS. 3A to 3D, the physical quantity G used consisting of the ratio T/P of the temperature T to the pressure P of the air inside of this tire.

The time t, on the x-axis of these diagrams, is in fact measured by number of sampling moments.

Figure 3A:
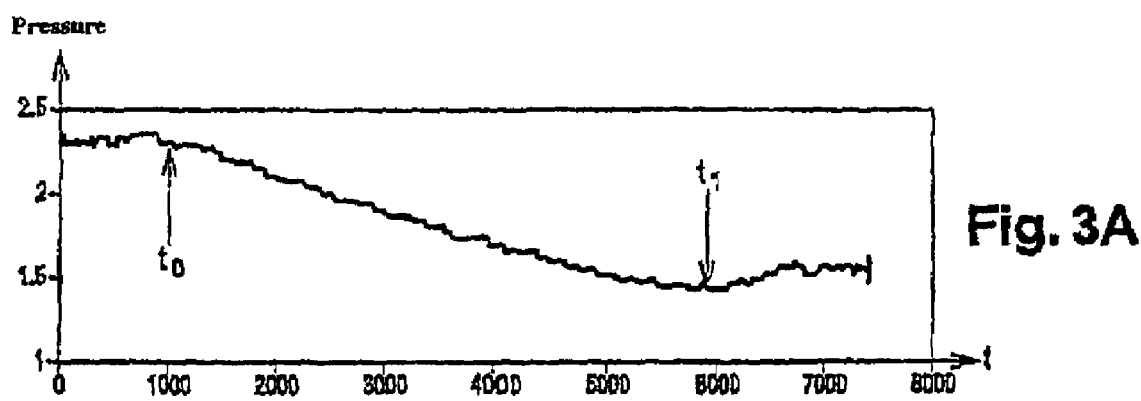
Figure 3B:
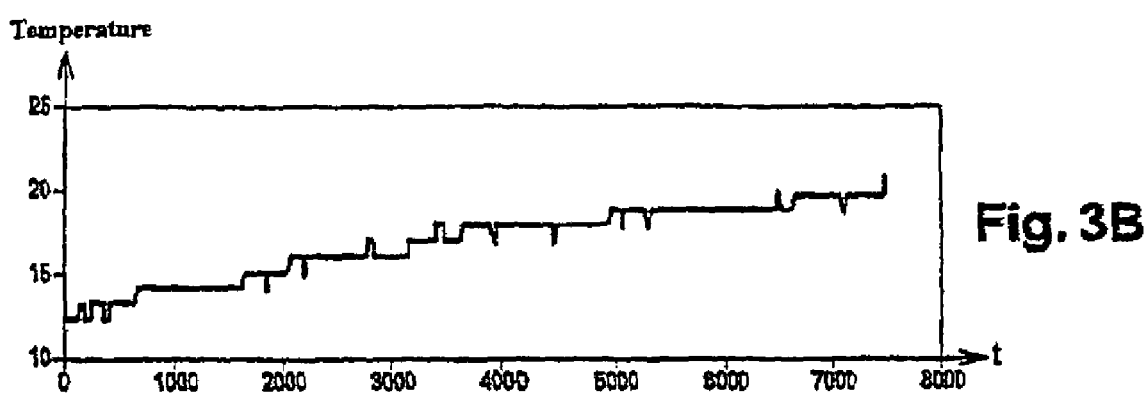
Figure 3C:
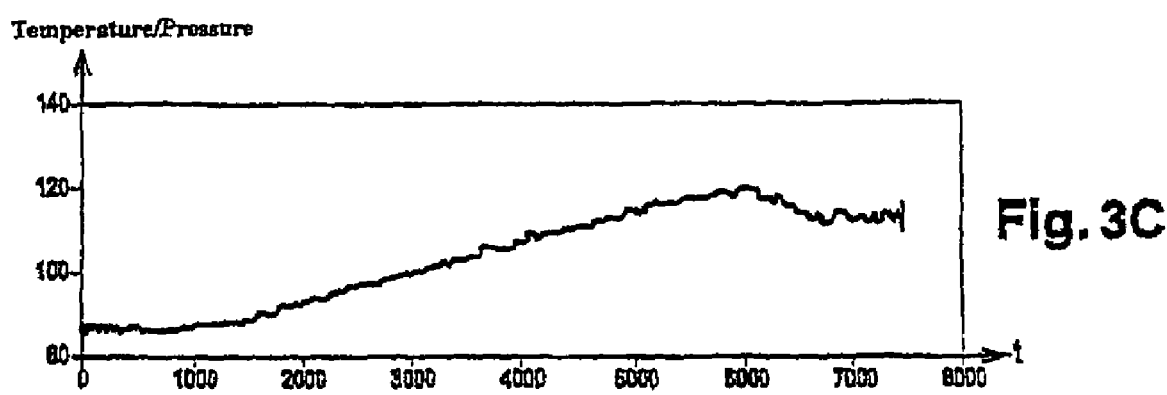
Figure 3D:
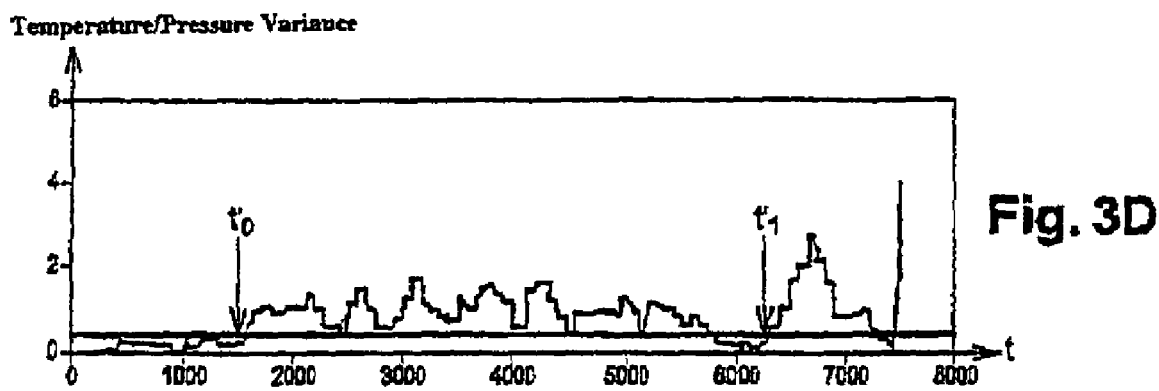

When a leak occurs (moment $t_0$ in FIG. 3A), the pressure P inside the tire drops slightly, the temperature T, on the other hand, being capable of varying only slowly, in the increasing direction (FIG. 3B).

Thus, the ratio T/P itself (FIG. 3C) also undergoes a relatively slow increase.

On the other hand, the variance in the ratio T/P (FIG. 3D) very quickly shows quite significant relative variations, and exceeds the limiting threshold L, in this case set at 0.5, at a moment $t'_0$, which follows very closely after the moment $t_0$ at the start of the leak, the leak alarm thus being capable of being sounded even though the temperature T has not yet changed.

At the moment $t_1$, the tube 11 comes into contact with the inside face of the tire 1.

Shortly afterward, the ratio T/P begins to decrease.

At the moment $t'_1$, after having decreased, the variance in the ratio T/P once again exceeds the limiting threshold L.

The combination of the decrease in the ratio T/P and the threshold L being exceeded by its variance makes it possible, at this moment $t'_1$, to issue an alarm for contact of the tube 11 with the inside face 10 of the tire 1.

The invention claimed is:

1. Method for monitoring the operational condition of a tire (1) equipping a vehicle, this method including at least the steps consisting in producing, over time, representative samples (G(n)) of successive values assumed by a changing physical quantity (G), under conditions otherwise equal, with respect to the number of moles (N) of gaseous fluid present in this tire (1), deducing from these samples an estimated condition of the tire (1), comparing said estimated condition to a range of normal driving conditions, and producing an alarm in the case where the estimated condition of the tire (1) is situated outside the range of these normal conditions, characterized in that the step of deducing from the samples includes at least one operation consisting in comparing an indicator of dispersion of said physical quantity (G) to a predetermined threshold value (L), wherein physical quantity (G) used consists of the ratio (T/P) of the temperature (T) of the gaseous fluid to its pressure (P), and the alarm indicates a leak in the tire (1), at least in a case where, at the same time, this physical quantity (G) increases while its variance ($S^2_1$(G)) exceeds the predetermined threshold value (L).

2. Monitoring method of claim 1, characterized in the said physical quantity (G) is chosen from the set including the pressure (P) of the gaseous fluid, the ratio (T/P) of the temperature (T) of the gaseous fluid to its pressure (P), and the ratio (P/T) of the pressure (P) of the gaseous fluid to its temperature (T).

3. Monitoring method as claimed in claim 1, characterized in that the step of exploiting the samples (G(n)) includes pre-formatting operations consisting in calculating at least one average ($M_{1j}$) from p1 successive samples of the physical quantity, and in calculating a sliding value ($S^2_1$(G)) for the indicator of dispersion of the physical quantity (G) from q1 averages, p1 and q1 being whole numbers greater than 1.

4. Monitoring method of claim 3, characterized in that each new calculation of the average ($M_{1j}$) is performed on p1 new samples (G(n)) of the physical quantity, different from the p1 samples used for the previous calculation of this average, and in that the sliding value for the indicator of dispersion of the physical quantity is recalculated upon each new calculation of the average.

5. Monitoring method as claimed in claim 3, characterized in that the step of exploiting the samples (G(n)) includes pre-formatting operations consisting in concurrently calculating k averages ($M_{ij}$-$M_{kj}$)from different respective numbers pk of successive samples (G(n)) of the physical quantity (G), and in calculating k sliding values ($S^2_{1(G)}$-$S^2_k$(G)) for the indicator of dispersion of the physical quantity (G) from different respective numbers qk of different averages, k, pk and qk being whole numbers greater than 1.

6. Monitoring method as claimed in claim 1, characterized in that the step of exploiting the samples (G(N)) further includes an operation consisting in taking into account the sign of the change in the physical quantity (G) and/or the speed (X'(t)) of the vehicle in order to distinguish, in the event of an alarm, between two different estimated conditions of the tire (1).

7. Monitoring method as claimed in claim 1, characterized in that the indicator of dispersion of the physical quantity (G) consists of the variance ($S^2_1(G)$) or the standard deviation for this quantity.

8. Monitoring method as claimed in claim 1, characterized in that the physical quantity (G) consists of the ratio (T/P) of the temperature (T) of the gaseous fluid to its pressure (P) and in that the alarm indicates reinflation of the tire (1) at least in the case where, at the same time, the physical quantity (G) decreases while its variance ($S^2_1(G)$) exceeds the predetermined threshold value (L) and while the speed (X'(t)) of the vehicle is zero.

9. Monitoring method as claimed in claim 1, characterized in that it is applied to a tire (1) containing a foam tube (11) capable of coming into contact with the inside face (10) of this tire (1).

10. Monitoring method of claim 9, characterized in that the physical quantity consists of the ratio (T/P) of the temperature (T) of the gaseous fluid to its pressure (P) and in that the alarm indicates contact of the foam tube (11) with the inside face (10) of the tire (1) at least in the case where, at the same time, the physical quantity (G) decreases while its variance ($S^2_1(G)$) exceeds the predetermined threshold value (L) and while the speed (X'(t)) of the vehicle is not zero.

11. Monitoring method as claimed in claim 2, characterized in that the step of exploiting the samples (G(n)) includes pre-formatting operations consisting in calculating at least one average ($M_{1,j}$) from p1 successive samples of the physical quantity, and in calculating a sliding value ($S^2_1(G)$) for the indicator of dispersion of the physical quantity (G) from q1 averages, p1 and q1 being whole numbers greater than 1.

12. Monitoring method as claimed in claim 2, characterized in that the step of exploiting the samples (G(N)) further includes an operation consisting in taking into account the sign of the change in the physical quantity (G) and/or the speed (X'(t)) of the vehicle in order to distinguish, in the event of an alarm, between two different estimated conditions of the tire (1).

13. Monitoring method as claimed in claim 2, characterized in that the indicator of dispersion of the physical quantity (G) consists of the variance ($S^2_1(G)$) or the standard deviation for this quantity.

14. Monitoring method as claimed in claim 2, characterized in that the physical quantity (G) consists of the ratio (T/P) of the temperature (T) of the gaseous fluid to its pressure (P) and in that the alarm indicates reinflation of the tire (1) at least in the case where, at the same time, the physical quantity (G) decreases while its variance ($S^2_1(G)$) exceeds the predetermined threshold value (L) and while the speed (X'(t)) of the vehicle is zero.

15. Monitoring method as claimed in claim 2, characterized in that it is applied to a tire (1) containing a foam tube (11) capable of coming into contact with the inside face (10) of this tire (1).

* * * * *